United States Patent [19]
Spies et al.

[11] Patent Number: 5,514,481
[45] Date of Patent: May 7, 1996

[54] LIGHT METAL CASTING

[75] Inventors: Robert Spies, Ingolstadt; Norbert Enning, Denkendorf; Heinrich Timm, Ingolstadt, all of Germany

[73] Assignee: Audi AG, Ingolstadt, Germany

[21] Appl. No.: 140,207

[22] PCT Filed: Mar. 20, 1992

[86] PCT No.: PCT/EP92/00622

§ 371 Date: Nov. 5, 1993

§ 102(e) Date: Nov. 5, 1993

[87] PCT Pub. No.: WO92/20562

PCT Pub. Date: Nov. 26, 1992

[30] Foreign Application Priority Data

May 17, 1991 [DE] Germany ............. 41 16 132.7

[51] Int. Cl.$^6$ .............. B62D 21/09; B62D 27/02; B62D 29/00
[52] U.S. Cl. .............. 428/582; 428/597; 428/598; 403/274
[58] Field of Search ............. 428/597, 596, 428/582, 583, 598, 603; 403/274, 279, 282

[56] References Cited

U.S. PATENT DOCUMENTS

| | | | |
|---|---|---|---|
| 708,723 | 9/1902 | Mathis | 403/274 |
| 1,622,598 | 3/1927 | Marshall | 49/399 |
| 2,293,596 | 8/1942 | Del Camp | 403/274 |
| 2,450,723 | 10/1948 | Elrad | 425/597 |
| 2,580,282 | 12/1951 | Colley | 428/597 |
| 2,598,152 | 5/1952 | Wright | 403/274 |
| 2,960,761 | 11/1960 | Preader | 428/582 |
| 3,999,356 | 12/1976 | Packman | 403/282 |
| 4,027,454 | 6/1977 | Schuplin | 403/282 |
| 5,221,180 | 6/1993 | Crider | 403/274 |

FOREIGN PATENT DOCUMENTS

| | | |
|---|---|---|
| 0146716 | 7/1983 | European Pat. Off. . |
| 54422 | 5/1950 | France . |
| 75187 | 8/1970 | Germany . |
| 565663 | 11/1944 | United Kingdom . |
| 1110346 | 4/1968 | United Kingdom . |
| 2058893 | 4/1981 | United Kingdom . |

*Primary Examiner*—John Zimmerman
*Attorney, Agent, or Firm*—Jacques M. Dulin

[57] ABSTRACT

A light metal casting for use in combination with a metal holder for mounting heavy subassemblies, such as doors or the like, to a light metal frame member of a light metal vehicle body framework, including a first, vertical leg portion having an outward facing surface to which a metal holder is mounted, and a second, inwardly-extending horizontal leg portion connected at an upper end of the first leg portion. The second leg portion is provided with a vertical through-hole oriented transversely to its surface, and, at the edge of the opening which faces the first leg, an upstanding tongue member is formed integrally on the second leg which points away from the first leg and can be bent over the holder. In order to fasten the holder to the light metal casting, the holder is first placed against the outer side of the vertical first leg, whereupon the tongue is bent in the direction of this outer side of the first leg and turned over the holding part until it presses the latter against the outer side of the first leg to hold it fast against the light metal casting. The holding part can thus be mounted on the light metal casting in a simple manner and very quickly, since it is only necessary to bend over the tongue.

2 Claims, 1 Drawing Sheet

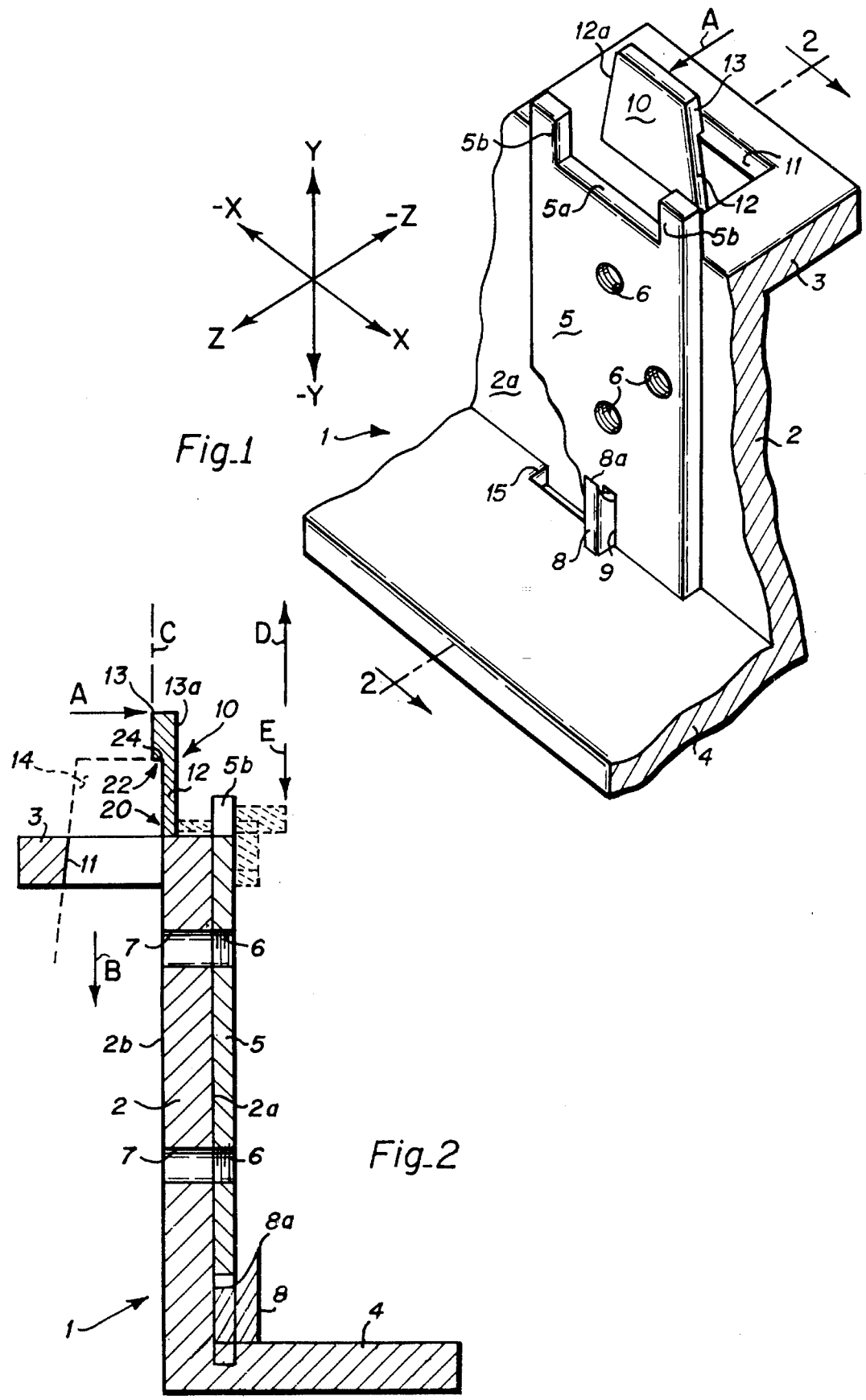

LIGHT METAL CASTING

FIELD

This present invention relates to a light metal casting for use in mounting heavy subassemblies, such as doors, on a light metal motor vehicle body framework, and to methods of producing and using the casting of this invention.

BACKGROUND

There is an increasing trend in motor vehicle body design, and in particular private passenger car body design, to assemble the vehicle supporting structure from light metal elements. An example of one such system is known from European Patent Document EP 0 146 716 B1 which discloses a vehicle body assembled from a plurality of extruded light metal hollow sections joined together by cast light metal node elements.

A disadvantage which such a light-metal bodywork design however is that in view of the lower yield strength of the light metal material as compared with heavy subassemblies, such as for example conventionally used sheet metal stampings, doors or the like, cannot be directly fastened to a light metal frame member without additional and often expensive reinforcement.

It has therefore already been proposed to provide on such light metal castings additional metal holding parts (holders) which serve to hold the heavy subassemblies. However, in order to mount these holders on the castings, it is necessary to machine the castings after they are formed. Thus, a relatively considerable expenditure of time is required for finishing the connection between the holding part and the casting. This additional time increases the cost of assembling the motor vehicle.

Accordingly, there is a definite need in the art for a light metal casting for use in mounting heavy vehicle subassemblies to a light-metal frame component which does not require additional machining after its formation in order to receive a metal holder.

THE INVENTION

OBJECTS

It is a principal object of the present invention to reduce the time and expense of mounting a heavy subassembly, such as for example a door or the like, to a light metal vehicle bodywork.

It is a related object of the invention to provide a light metal casting for use in mounting heavy subassemblies which can be produced in a simple manner and which is configured to quickly receivingly engage a metal holder without additional machining or great expense.

These and other objects and advantages will become apparent from the following written description, drawings and appended claims.

SUMMARY

The invention comprises an apparatus, its use, method of fabrication of a light metal casting for use in combination with a metal holder for mounting heavy subassemblies, such as for example doors or the like, to a light metal frame member of a light metal vehicle body framework. The invention is directed to overcoming the problem of how to mount the metal holder to the light metal casting in a simple, inexpensive and strong manner.

In accordance with the apparatus aspects of the invention, the light metal casting comprises: a first, vertical leg portion having an outward facing surface to which a metal holder is mounted; and a second, inwardly-extending horizontal leg portion connected at an upper end of the first leg portion. The second leg portion is provided with a vertical through-hole oriented transversely to its surface, and, at the edge of the opening which faces the first leg, an upstanding tongue member is formed integrally on the second leg which points away from the first leg and can be bent over the holder.

In order to fasten the holder to the light metal casting, the holder is first placed against the outer side of the vertical first leg, whereupon the tongue is bent in the direction of this outer side of the first leg and turned over the holding part until it presses the latter against the outer side of the first leg to hold it fast against the light metal casting.

The holding part can thus be mounted on the light metal casting in a simple manner and very quickly, since it is only necessary to bend over the tongue. Since the tongue and the light metal casting are formed integrally joined to one another during the same casting operation, no additional machining is required to provide a means for fastening the holding part to the light metal casting.

According to the method aspect of the invention, the light metal casting along with the integrally formed tongue is produced with the aid of two mold parts including a first mold part which is situated along the inside surface of the first leg portion and a second mold part situated along the outside of the first leg portion. The first mold part further has an upward extension which protrudes through the vertical through hole of the second leg portion. Once the casting process is complete the two mold parts are pulled apart in opposite parallel directions such that the upward extension of the first mold part moves downward through and out of the vertical through hole of the second leg portion.

Since the two mold parts are removed in opposite directions to one another it is possible to configure the tongue with a cross-sectional thickness which increase towards its free end. The effect is thereby achieved that the bendability of the tongue can be controlled in a desired manner. For example, when force is applied to the tongue free end in the direction of the holder, the tongue first bends over at its base end directly at the top edge of the second leg and then upon continuation of force, the tongue bends downwards at its middle to wrap over pivoting over the upper free edge of the holder.

By way of example, the cross-sectional thickness of the tongue, that is to say the thickness at right angles to the plane of the tongue, may be increased in steps in order to purposely define the bending regions of the tongue and the sequence of the regions of the tongue where bending is to take place in succession.

Alternately, the cross-sectional thickness of he tongue can increase continuously from its juncture at the top edge of the second leg portion in order to locate the first bending region as close as possible to the top face of the second leg. Upwards from this region, the thickness of the tongue may be increased in steps, for which purpose the tongue has a stepped projection pointing inwardly (away from) the holder element. These projection(s) thus are spaced above the vertical through-hole in the second leg. By use of such projection(s), i.e. the increased thickness of the tongue, the location of second bending region can then be determined as required to match the thickness of the holder element so that it cones to lie above (coordinate with) the front edge of the holder after the tongue has been bent over (parallel to the second leg).

An additional advantageous feature of the invention comprises providing a retaining means on the lower portion of the outer side of the first leg for fastening the bottom end of the holder to the casting at a point remote from the tongue. The holder can thus be fastened at opposite ends on the light metal casting, so that it is more effectively secured in position.

The holder bottom retaining means preferably includes an upwardly pointed lug which projects through a perforation or slot formed in the bottom end of the holder.

It is preferred to provide the lug with sufficient upward projection (vertical length) to prevent the holder from tilting downwards or pivoting at right angles with respect to the first leg portion.

In another embodiment of the invention, the holder bottom retaining means includes a third leg portion which is integrally formed at the lower, free end of the first vertical leg portion, and on which the bottom end of the holder rests. The third leg portion extends horizontally in the direction opposite to the upper, second leg portion. The light metal casting inside elevation thus resembles an S-shaped structure. In order to prevent side-to-side (twisting or pivoting) movement of the holder with respect to the first vertical leg portion, a groove may be provided in the top surface of the third leg portion which is sized for receiving the bottom end of the holder therein.

The holder may for example be in the form of a plate having a cutout or slot in which the lug is received. The lug may also be fastened both to the first and to the third leg portions.

For the purpose of supporting heavy subassemblies, such as for example doors and the like, the holder is preferably made of high-strength material, for example steel. Through bores, for example threaded through bores, may be provided in the holder to enable a door hinge, for example, to be fastened thereto.

DRAWINGS

The invention is described more fully below with reference to the drawings, in which:

FIG. 1 is an isometric view of a light metal casting constructed in accordance with one embodiment of the invention shown with an attached holder; and FIG. 2 is a section view through the light metal casting and holder taken along the line and in the direction of arrows 2—2 of FIG. 1.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a perspective view of a light metal casting according to the invention, which is, for example, an aluminum pressure diecasting. The light metal casting is given the reference numeral 1 and has an S-shaped cross-sectional shape. It may, for example, consist of a corresponding sectional bearer member whose longitudinal direction extends from the lower right portion to the upper top left portion in FIG. 1. (The direction of axis X in the 3-D axis orientation guide seen on the left of FIG. 1.)

As can be seen from the present exemplary embodiment, the light metal casting includes a first upright (vertical) leg portion 2, a second, upper horizontal leg portion 3 and a third, lower, horizontal leg portion 4. All the leg portions 2, 3 and 4 are formed integrally joined together, with the second leg portion 3 and the third leg portion 4 lying at opposite top and bottom ends of the first leg portion 2 and extending in opposite horizontal directions. The leg portions 2, 3 and 4 are preferably in the form of flat plates and may have identical or different wall thicknesses. An angle of 90° is selected both between the first leg portion 2 and the second leg portion 3, and between the first leg portion 2 and the third leg portion 4.

An outer side surface of the first leg portion 2 is given the reference numeral 2a. A holder 5, which is preferably in the form of a flat steel plate of rectangular shape, lies against this outer side surface 2a of the first leg portion 2. The plate 5 therefore lies with one main surface directly on the outer side surface 2a. For the purpose of fastening a subassembly (not shown) the plate 5 is provided with threaded through bores 6 which extend at right angles to the plane of the plate. Screws can be screwed into these threaded bores 6 in order to connect, for example, a vehicle door hinge to the plate 5.

Alternately, it is also possible to provide the plate 5 with unthreaded through bores (FIG. 2) which are in alignment with corresponding through bores 7 provided in the first leg portion 2 (see FIG. 2). In this case, in order to fasten a subassembly to the plate 5, threaded bolts, for example, can be passed through the coaligned bores 6 and 7 and can be screwed into nuts which lie against the inner side surface 2b of the first leg portion 2. Suitable washers may be disposed between the nuts and the first leg portion 2.

The plate or holder 5 stands with its bottom edge on the inner face of the third leg portion 4 and is fixed in position by a lug 8. The lug 8 is preferably integrally joined to both the leg portions 2 and 4 in the corner region between the first leg portion 2 and the third leg portion 4 and projects through a perforation, slot or cutout 9 provided in the edge of the bottom end of the plate 5. In particular, the lug 8 is configured such that its free end 8a projects upwardly towards the second leg portion 3. In this way, the free end 8a of the lug 8 engages the plate 5 and prevents the plate 5 from movement at right angles with respect to the first leg portion 2 (i.e, along the Z-axis), as there is a tendency for the plate 5 to pivot away from outer side surface 2a when, as described below, a tongue and a lug are bent over the top of the plate 5 to secure it to the leg 2. For this purpose, the shape and thickness dimension of the free end 8a of the lug 8 and the depth of the cutout 9 are appropriately selected, adjusted to match one another so that a minimum, or substantially no clearance is left between the top end of the lug 8 and the adjacent edge of the slot 9 in plate 5. The shape of the top part of the lug 8, starting from the tip region 8a, may, for example, extend in a curve downwards in the direction of the first leg portion 2.

In addition, the lug 8 prevents movement of the plate 5 in the longitudinal direction of the light metal casting 1, that is to say parallel to the first leg portion 2, (in the direction of the X axis) since the vertical sides of the cutout 9 of the plate 5 lie about the sides of the lug 8 practically without clearance.

Alternately, in order to prevent movement of the plate 5 at right angles to the first leg 2 (i.e., along the Z-axis), a groove 15 is provided in the third leg portion 4, disposed adjacent the corner region between the first leg portion 2 and the third leg portion 4. The groove 15 is preferably sized to receivingly engage the bottom end of the plate 5 in snug fit fashion. In the case of a groove, the special configuration of the lug 8 in its tip region 8a can be omitted as not necessary.

In order to fasten the plate 5 in its top region to the first leg portion 2, it is provided with a cutout 5a in its top end edge. This edge cutout 5a extends downwards into the plate 5 to such a depth that the bottom of the cutout is in substantial vertical alignment with the top surface of the second leg portion 3. In this way, left and right side projections or ears 5b are formed at the top end of the plate 5.

The width of the edge cutout 5a is sized to receive and center a tongue 10, which when forwardly (i.e., in the direction of the Z axis) and downwardly bent (Arrow E, FIG. 2) comes to lie between the side projections 5b of the plate 5 in order to fasten the plate 5 to the casting 1. As shown in FIG. 1 the tongue 10 is in the unbent state.

As FIG. 1 shows, the second leg portion 3 is provided with a through hole 11 of generally rectangular shape.

The longer sides of the through opening 11 extend parallel to the outer side surface 2a of the first leg 2 and therefore parallel to the plate 5. The tongue 10 is integrally formed on the second leg 3 at that edge of the through opening 11 which faces (is closest to) the first leg 2. The tongue 10 projects upwards and extends substantially at right angles to the second leg 3 and parallel to the first leg 2, in the direction away (i.e., along the Y axis) from leg 3.

A bottom region 12 of the tongue 10 is provided with a thin wall, which means that the tongue 10 has only a slight thickness at right angles to its plane. On the other hand, a projection or lug 13 is formed at the free end of the tongue 10, that is, a region of relatively thick material, viewed in a direction at right angles to the plane of the tongue. The thickness of the projection or lug 13 extends parallel to the plane of the second leg portion 3, that is, in the lateral direction (i.e., along the Z-direction) of the light metal casting 1, and in addition lies above and projects into the projection of the through opening 11. It is therefore situated on the side of the tongue 10 remote (opposite) from the plate 5. That side of the tongue 10 which faces the plate 5 is completely flat and extends at right angles to the surface of the second flange 3.

As shown in FIG. 1, the tongue 10, viewed at right angles to the plane of the tongue, may have a trapezoidal cross-section, the width of the tongue being greater adjacent the upper face of the second leg portion 3 than at the free end of the tongue. The thickness of the tongue 10 in FIG. 1 is constant in the bottom region 12, but, in an alternate embodiment, its thickness may increase continuously in the Y-direction toward its free end (i.e, tapered or stepped), although for the sake of clarity this has not been shown in detail in the drawing.

Through the selection of the thickness of the tongue 10, viewed in FIG. 2 at right angles to the plane of the tongue, bending regions for the tongue 10 can be defined, that is regions in which the tongue 10 can easily be bent in succession. In particular by means of a trapezoidal thickness pattern at right angles to the plane of the tongue, with the thickness of the tongue 10 at its minimum in the immediate vicinity of the second leg portion 3, it is possible to bring a first bending region 20 of the tongue 10 very close to the second leg portion 3. A second bending region 22 of the tongue 10 is obtained in the transition of the shoulder 24 of the still thicker projection or lug 13.

If therefore a force is first applied to the tongue 10 in the direction of the arrow A in FIG. 1, it will first bent at 20 (FIG. 2) in its bottom region 12 near the second flange 3 or, e.g., in the case of a trapezoidal thickness pattern, it will bend at the edge of the through opening 11. The tongue 10 then first lies horizontally, projecting into the edge cutout 5a. The width of the tongue 10 in the longitudinal direction, (X, X) of the light metal casting 1 can be so selected that no substantial clearance is left between the edges 12a of the tongue 10 and the projections 5b, so that even at this stage the tongue 10 prevents the pivoting or tipping of the plate 5 in its own plane. The taper of edges 12a help center the tongue and the plate 5. If the lug 13 of tongue 10 is then bent over further with greater exertion of force (arrow E, FIG. 2), it will bend in the bending region 22 between the bottom region 12 and the lug 13, so that finally the rear side 13a of the projection 13 presses against the free side of the plate 5 and secures the latter to the leg 2. The height of the bottom region 12 above the second leg 3 is selected so that, after the tongue 10 has been bent over by 90°, the bending region between the bottom region 12 and the lug 13 is aligned with the front, free edge of the plate 5.

FIG. 2 shows a cross-section along the line 2—2 in FIG. 1, that is, a section at right angles to the longitudinal (X, -X) direction of the light metal casting 1. The tongue 10 is shown in phantom in the bent over conditions with plate 5 being secured against the outer side 2a of the first flange 2.

As can be seen, in the process of molding of the light metal casting, plate 5 not being present, a mold part 14 (shown in phantom) projects from below through the opening 11 which is being formed in the second leg portion 3, and serves to produce the special thickness configuration of the tongue 10 in its bottom region 12 and to form the step or shoulder 24 between the region 12 and the lug 13. After the molding of the light metal casting 1, the mold part 14 is pulled out downwards, that is oppositely to the direction in which the tongue extends, from the through opening 11 in the direction of the arrow B in FIG. 2. The parting plane is given the reference C in FIG. 2. Through the special arrangement of the mold part 14 in the molding of the light metal casting 1 the thickness of the tongue 10 at right angles to the plane of the tongue can thus be adjusted in the desired manner in the bottom region 12, such that it increases towards the free end of the tongue in order in this way to be able to determine defined bending regions, which extend parallel to the surface of the second leg portion 3, within the tongue 10.

The second mold part, which is not explicitly shown in FIG. 2, is situated on the right-hand side of the tongue 10 in FIG. 2, that is on the right of the first leg 2 and above the third leg 4. After the molding of the light metal casting 1 it is removed in the direction of arrow D, that is it is pulled upwards in FIG. 2.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A light metal casting for use in mounting heavy subassemblies on a light metal vehicle framework, comprising in operative combination:

a) a first leg having an outer side surface;

b) a second leg having a through opening extending transversely to its leg surface, said through opening having an edge facing said first leg;

c) a holder fastened to said outer side of said first leg;

d) a tongue formed integrally at said edge of said through hole opening and disposed on said second leg, said tongue includes a free end pointing away from said first leg and which can be bent over said holder, and said tongue has a cross-sectional thickness increasing towards its free end.

2. A light metal casting according to claim 1, characterized in that said cross-sectional thickness of said tongue increases in steps.

* * * * *